United States Patent
Mori et al.

(10) Patent No.: US 9,044,737 B2
(45) Date of Patent: Jun. 2, 2015

(54) RADIOACTIVE IODINE ADSORBENT AND RADIOACTIVE IODINE REMOVAL APPARATUS

(75) Inventors: Norihisa Mori, Tokyo (JP); Naoyuki Kamishima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/700,617

(22) PCT Filed: Apr. 25, 2011

(86) PCT No.: PCT/JP2011/060081
§ 371 (c)(1),
(2), (4) Date: Nov. 28, 2012

(87) PCT Pub. No.: WO2011/158564
PCT Pub. Date: Dec. 22, 2011

(65) Prior Publication Data
US 2013/0068102 A1    Mar. 21, 2013

(30) Foreign Application Priority Data

Jun. 15, 2010 (JP) .................................. 2010-136615

(51) Int. Cl.
*B01J 20/22* (2006.01)
*B01J 20/08* (2006.01)
(Continued)

(52) U.S. Cl.
CPC  *B01J 20/22* (2013.01); *B01J 20/08* (2013.01); *B01J 20/103* (2013.01); *B01J 20/18* (2013.01);
(Continued)

(58) Field of Classification Search
CPC .......... B01J 20/08; B01J 20/10; B01J 20/103; B01J 20/18; B01J 20/20; B01J 20/22; B01J 20/28045; B01J 20/28033; B01J 20/3204; B01J 20/3248; B01D 53/02; B01D 2257/2068; G21F 9/02

See application file for complete search history.

(56) References Cited

U.S. PATENT DOCUMENTS 2,973,828 A * 3/1961 Engle .............................. 96/118
4,040,802 A * 8/1977 Deitz et al. ...................... 95/142
(Continued)

FOREIGN PATENT DOCUMENTS

EP        1868209 A1    12/2007
JP      59-008419 B2     2/1984
(Continued)

OTHER PUBLICATIONS

English translation of the Written Opinion of the International Searching Authority dated May 31, 2011 correponding to PCT/JP2011/060081. (5 pages).

(Continued)

*Primary Examiner* — Christopher P Jones
(74) *Attorney, Agent, or Firm* — Westerman, Hattori, Daniels & Adrian, LLP

(57) ABSTRACT

A radioactive iodine removal apparatus applying a radioactive iodine adsorbent according to an embodiment of the present invention includes an iodine filter that is provided in a chamber of a duct to which flue gas containing radioactive iodine is fed, and includes a radioactive iodine adsorbent that adsorbs radioactive iodine contained in the flue gas. The radioactive iodine adsorbent includes a carrier constituting a matrix and an impregnated substance with which the carrier is impregnated. The impregnated substance contains at least TEDA, and an impregnated amount of the TEDA is from 3.0% by mass to less than 10.0% by mass.

6 Claims, 6 Drawing Sheets

(51) Int. Cl.
   *B01J 20/10*    (2006.01)
   *B01J 20/18*    (2006.01)
   *B01J 20/20*    (2006.01)
   *B01J 20/28*    (2006.01)
   *B01J 20/32*    (2006.01)
   *G21F 9/02*     (2006.01)
   *B01D 53/02*    (2006.01)
   *B01J 20/04*    (2006.01)

(52) U.S. Cl.
   CPC ............ *B01J 20/20* (2013.01); *B01J 20/28033* (2013.01); *B01J 20/28045* (2013.01); *B01J 20/3204* (2013.01); *B01J 20/3248* (2013.01); *G21F 9/02* (2013.01); *B01D 53/02* (2013.01); *B01J 20/046* (2013.01); *B01J 20/3236* (2013.01)

(56) References Cited

U.S. PATENT DOCUMENTS

| | | | | |
|---|---|---|---|---|
| 4,049,406 A | * | 9/1977 | Rivers | 96/129 |
| 4,111,833 A | * | 9/1978 | Evans | 502/401 |
| 4,133,651 A | * | 1/1979 | Hoy et al. | 95/116 |
| 4,204,980 A | * | 5/1980 | Pasha et al. | 502/401 |
| 4,312,647 A | | 1/1982 | Tsuchiya et al. | |
| 4,615,806 A | * | 10/1986 | Hilton | 210/690 |
| 4,802,898 A | * | 2/1989 | Tolles | 95/132 |
| 5,145,820 A | * | 9/1992 | Liang et al. | 502/401 |
| 5,457,230 A | * | 10/1995 | Yang et al. | 562/608 |
| 2010/0006505 A1 | * | 1/2010 | Smith et al. | 210/660 |

FOREIGN PATENT DOCUMENTS

| | | |
|---|---|---|
| JP | 61-230096 A | 10/1986 |
| JP | 02-147898 A | 6/1990 |
| JP | 2-263199 A | 10/1990 |
| JP | 6-47899 U | 6/1994 |
| JP | 2002-350588 A | 12/2002 |
| JP | 2005-329326 A | 12/2005 |
| JP | 2010-054447 A | 3/2010 |
| WO | 81/02256 A1 | 8/1981 |

OTHER PUBLICATIONS

International Search Report of PCT/JP2011/060081, mailing date of May 31, 2011.
Written Opinion of PCT/JP2011/060081, mailing date of May 31, 2011.
Office Action dated May 27, 2014, issued in corresponding Japanese Patent Application No. 2010-136615, with English Translation (6 pages).
Office Action dated Dec. 24, 2014, issued in corresponding Japanese Patent Application No. 2010-136615, with English translation (10 pages).
Extended European Search Report dated Mar. 20, 2015, issued in corresponding European Patent Application No. 11795472.7 (6 pages).

* cited by examiner

RADIOACTIVE IODINE ADSORBENT
14

[IMPREGNATED AMOUNT OF TEDA: 3.0% BY MASS]

[IMPREGNATED AMOUNT OF TEDA: 5.0% BY MASS]

[IMPREGNATED AMOUNT OF TEDA: 10.0% BY MASS]

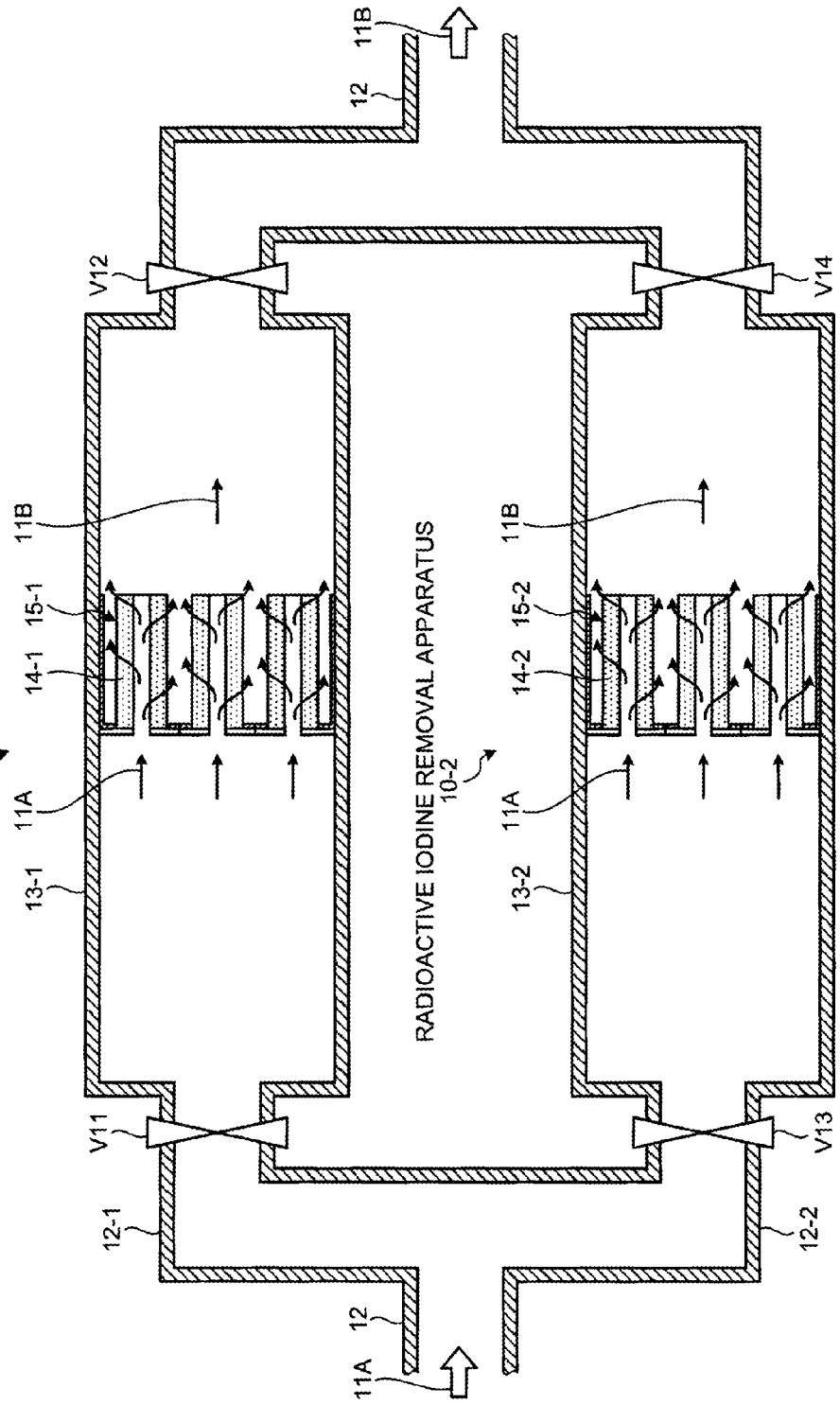

RADIOACTIVE IODINE ADSORBENT AND RADIOACTIVE IODINE REMOVAL APPARATUS

FIELD

The present invention relates to a radioactive iodine adsorbent and a radioactive iodine removal apparatus that removes radioactive iodine contained in flue gas in a high-humidity atmosphere, which is used in an air-conditioning and ventilating system of nuclear power facilities, radiation facilities, hospitals, research laboratories, and the like.

BACKGROUND

In a nuclear power plant such as a nuclear generation facility, it is an important issue to suppress emission of radioactive gas, particularly radioactive iodine composed of an organic iodine compound whose main component is molecular iodine ($^{129}I_2$, $^{131}I_2$, $^{133}I_2$, hereinafter, simply "$I_2$") and methyl iodide ($CH_3^{129}I$, $CH_3^{131}I$, $CH_3^{133}I$, hereinafter, simply "$CH_3I$") to the air, from a standpoint of preserving the ambient environment.

Conventionally, to prevent emission of radiation to the air from a nuclear power facility such as a nuclear generation facility at the time of an accident or the like, an iodine filter including an iodine adsorbent that adsorbs radioactive iodine is provided in an air-conditioning and ventilating system of the nuclear power facility, so that radioactive iodine contained in the gas is removed.

As the iodine adsorbent, for example, KI-impregnated activated carbon in which activated carbon is impregnated with kalium iodide (KI), Ag zeolite in which zeolite is impregnated with silver (Ag), and TEDA carbon in which activated carbon is impregnated with triethylene diamine (TEDA) can be mentioned (see, for example, Patent Literature 1). By using the KI-impregnated activated carbon as the iodine adsorbent, radioactive iodine is isotopically replaced by non-radioactive iodine of the KI-impregnated activated carbon, thereby collecting radioactive iodine. By using the Ag zeolite as the iodine adsorbent, radioactive iodine reacts with Ag of Ag zeolite to become silver iodide (AgI), thereby collecting radioactive iodine. By using the TEDA carbon as the iodine adsorbent, TEDA reacts with radioactive iodine to remove radioactive iodine.

In a nuclear power facility, to reduce emission of radioactive iodine contained in gas into the air as much as possible by an iodine filter, not only at the time of occurrence of an accident but also at the time of a steady operation, a radioactive iodine removal apparatus including an iodine adsorbent that removes radioactive iodine is provided also in the air-conditioning and ventilating system in a reactor building, an auxiliary building, and the like. Hygroscopic moisture in flue gas from the air-conditioning and ventilating system depends on the weather condition of the ambient air, and when the humidity in the ambient air is high such as a case of rain, the relative humidity of flue gas from the air-conditioning and ventilating system may reach up to 90%. When the ambient air is dry, the relative humidity of flue gas in the air-conditioning and ventilating system decreases to a very low level. Furthermore, in a system having an air handling unit, for example, a cooling coil in the air-conditioning and ventilating system, flue gas from the air-conditioning and ventilating system is cooled by the air handling unit. Therefore, the relative humidity of flue gas increases at an outlet of the air handling unit. When flue gas from the air-conditioning and ventilating system is used for heating, on the contrary, the temperature of flue gas from the air-conditioning and ventilating system increases, and the relative humidity of flue gas decreases. The ambient air may be directly supplied without being treated by the air handling unit.

As described above, the radioactive iodine removal apparatus provided in the air-conditioning and ventilating system handles flue gas under broad humidity conditions with a relative humidity of 0% to 100%. The conventionally used iodine adsorbent is likely to be affected by the humidity in flue gas, and when the humidity in flue gas is high, the iodine removal performance of the iodine adsorbent decreases, and thus radioactive iodine cannot be removed stably and with high efficiency.

There is a proposal of an adsorbent in which a carrier such as alumina is impregnated with silver nitrate or silver sulfate and an organic layer is provided on the surface thereof, as an iodine adsorbent that suppresses a decrease in the radioactive iodine removal performance even if the humidity in gas containing radioactive iodine is high (see, for example, Patent Literature 2).

CITATION LIST

Patent Literatures

Patent Literature 1: Japanese Patent Application Laid-open No. 2002-350588

Patent Literature 2: Japanese Patent Publication No. 59-008419

SUMMARY

Technical Problem

In a conventional adsorbent in which alumina is impregnated with silver nitrate or silver sulfate and an organic layer is provided on the surface thereof as described in Patent Literature 2, a high radioactive iodine removal performance can be obtained in a relatively high temperature atmosphere of about 100° C. or higher. However, the radioactive iodine removal performance decreases at a normal temperature, and thus it becomes difficult to obtain a sufficient radioactive iodine removal performance and to obtain an adsorbent that can maintain a high radioactive iodine removal performance stably in a high-humidity atmosphere, and the adsorbent may not be able to be used for a long time.

Furthermore, the iodine adsorbent needs to remove radioactive iodine stably by a predetermined standard value for replacement (for example, 97%) or more. When a radioactive iodine removal rate falls below the predetermined standard value for replacement (for example, 97%), the iodine adsorbent is replaced by a new iodine adsorbent, and the used iodine adsorbent is handled as low-level waste.

Accordingly, to suppress discharge of the low-level waste, there is a need for an iodine adsorbent that can stably maintain the radioactive iodine removal rate higher than the predetermined standard value for replacement (for example, 97%) even in flue gas in the high-humidity atmosphere and can be used for a long time.

The present invention has been achieved to solve the above problems, and an object of the present invention is to provide a radioactive iodine adsorbent and a radioactive iodine removal apparatus that can stably maintain the radioactive iodine removal rate higher than a predetermined standard value for replacement even in flue gas in a high-humidity atmosphere and can be used for a long time.

Solution to Problem

To solve the above problems and achieve the object of the present invention, the present inventors have done intensive studies on the radioactive iodine adsorbent and the radioactive iodine removal apparatus. As a result, it has been found that TEDA has an excellent adsorption performance for radioactive iodine, particularly, $CH_3I$, and by using TEDA as an impregnated substance impregnated on a carrier of the adsorbent for radioactive iodine and setting an impregnated amount thereof within a predetermined range, the adsorbent becomes less susceptible to the humidity even in an atmosphere having a severe humidity change, and thus a decrease in the radioactive iodine removal performance can be suppressed, and the radioactive iodine removal rate at an initial stage of use is improved while stably maintaining the removal rate of radioactive iodine contained in gas to be treated higher than a predetermined standard value for replacement, thereby enabling to use the adsorbent for a long time. The present invention has been achieved based on these findings.

According to a first aspect of the present invention, there is provided a radioactive iodine adsorbent for adsorbing radioactive iodine contained in gas to be treated, including: a carrier constituting a matrix; and an impregnated substance impregnated on the carrier, wherein the impregnated substance contains at least triethylene diamine, and an impregnated amount of the triethylene diamine is from 3.0% by mass to less than 10.0% by mass.

According to a second aspect of the present invention, there is provided the radioactive iodine adsorbent according to the first aspect, wherein the impregnated substance further contains at least one of potassium iodide, iodine, and silver.

According to a third aspect of the present invention, there is provided the radioactive iodine adsorbent according to the first or second aspect, wherein the carrier is constituted by at least one of activated carbon, alumina, zeolite, silica gel, and activated earth.

According to a fourth aspect of the present invention, there is provided the radioactive iodine adsorbent for according to any one of the first to third aspects, wherein a shape of the carrier is granular, fibrous, or mat-like.

According to a fifth aspect of the present invention, there is provided the radioactive iodine adsorbent according to any one of the first to fourth aspect, wherein the gas to be treated is flue gas emitted from an air-conditioning and ventilating system of a nuclear power facility.

According to a sixth aspect of the present invention, there is provided a radioactive iodine removal apparatus that is provided in a duct or a chamber to which gas to be treated containing radioactive iodine is fed, the radioactive iodine removal apparatus including: the radioactive iodine adsorbent according to any one of the first through fifth aspects that adsorbs radioactive iodine contained in the gas to be treated.

Advantageous Effects of Invention

According to the present invention, by using TEDA as an impregnated substance and impregnating a carrier of an iodine adsorbent with TEDA in a predetermined amount, the adsorbent can be used for a long time, while stably maintaining a radioactive iodine removal rate higher than a predetermined standard value for replacement even in flue gas in a high-humidity atmosphere.

BRIEF DESCRIPTION OF DRAWINGS

FIG. 9 depicts treatment of flue gas in a case where a plurality of ducts are provided.

DESCRIPTION OF EMBODIMENTS

A preferred mode for carrying out the present invention (hereinafter, "embodiment") will be explained below in detail with reference to the accompanying drawings. The present invention is not limited to the contents described in the following embodiment. Furthermore, constituent elements in the following embodiment include those that can be easily assumed by persons skilled in the art, that are substantially equivalent, and so-called equivalents. In addition, constituent elements disclosed in the following embodiment can be combined as appropriate.

<Radioactive Iodine Removal Apparatus>

Figure 1:
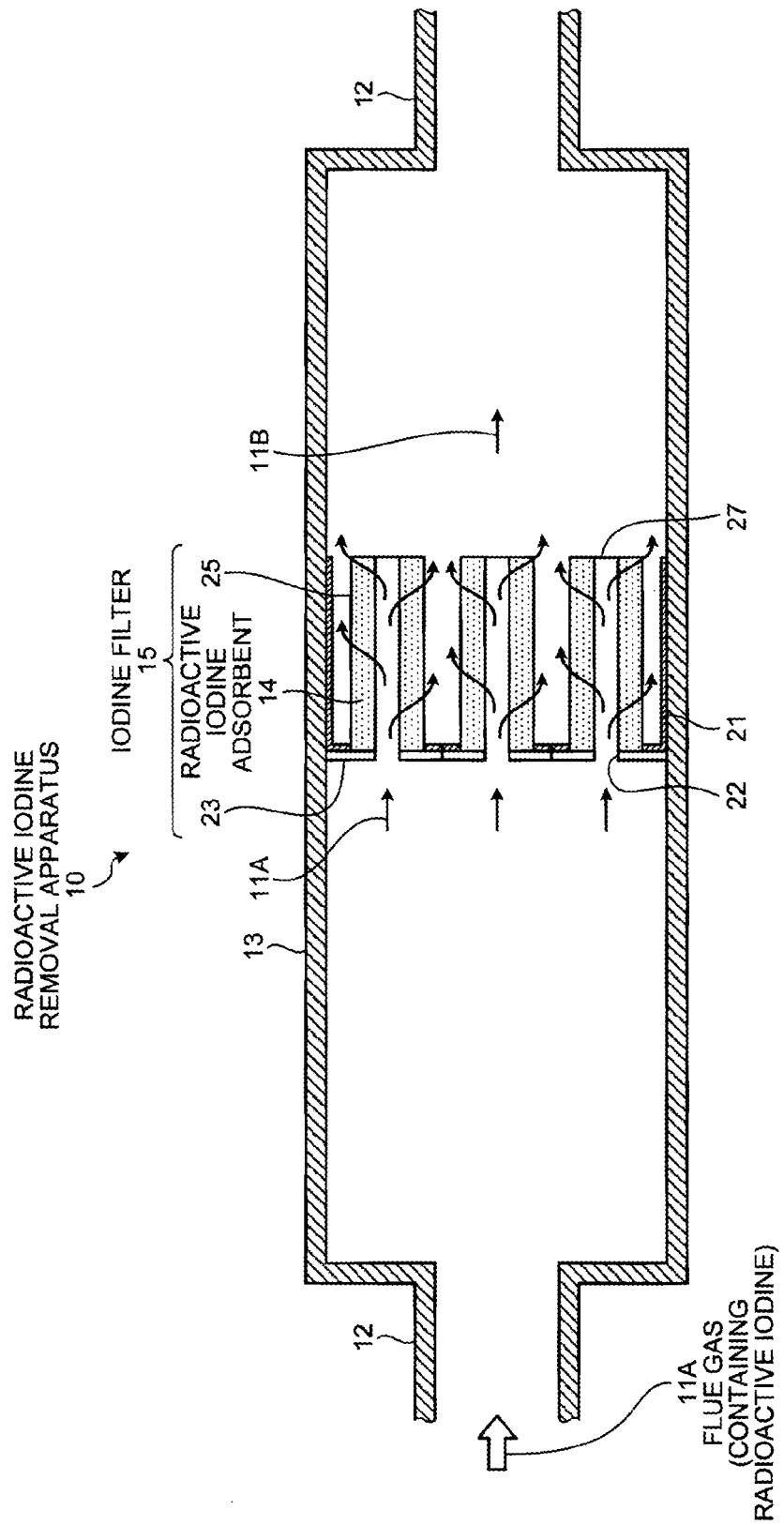
FIG. 1 is a schematic diagram of a configuration of a radioactive iodine removal apparatus according to an embodiment of the present invention.

An apparatus for removing radioactive iodine (hereinafter, "radioactive iodine removal apparatus") applying an adsorbent for radioactive iodine (hereinafter, "radioactive iodine adsorbent") according to an embodiment of the present invention is explained with reference to the drawings. FIG. 1 is a schematic diagram of a configuration of the radioactive iodine removal apparatus according to the embodiment of the present invention. As shown in FIG. 1, a radioactive iodine removal apparatus 10 applying the radioactive iodine adsorbent according to the present embodiment includes an iodine filter 15 provided in a chamber (a container) 13 of a duct 12 to which flue gas (gas to be treated) 11A containing radioactive iodine is fed, and including a radioactive iodine adsorbent 14 that adsorbs radioactive iodine contained in the flue gas 11A.

Radioactive iodine includes $^{129}I$, $^{131}I$, and $^{133}I$, and $^{129}I$ is mainly generated in a reprocessing facility, and $^{131}I$ and $^{133}I$ are mainly generated in a reactor facility. The half-life of $^{129}I$ is as extremely long as $10^7$ years, but an amount of emission is small and energy is low. The half-life of $^{131}I$ is as short as 8 days, but an amount of emission is large and energy is high. Accordingly, most dangerous fission product nuclides in an exhaust system of a reactor are $^{131}I$ and $^{133}I$, which are objects to be measured and evaluated in the nuclear power facility. In the present embodiment, $^{129}I$, $^{131}I$, and $^{133}I$, which are radioactive iodine, are simply referred to as "I". In the present embodiment, the property of radioactive iodine includes elemental molecular iodine ($I_2$) and an iodine compound. $I_2$ includes granular $I_2$ and the like in which $I_2$ adsorbs on aerosol particles and behaves as a particle. The iodine compound includes hydroiodic acid (HI), hypoiodous acid (HOI), and an organic iodine compound. As a representative substance of the organic iodine compound, methyl iodide ($CH_3I$) can be mentioned.

The iodine filter 15 is provided in a gasket provided in the chamber 13. Three iodine filters 15 are provided in a casing 21. The iodine filter 15 includes the radioactive iodine adsorbent 14, a gas introduction unit 23 having a gas introduction hole 22, and a pair of filter bodies 25 that houses the radioactive iodine adsorbent 14 that adsorbs radioactive iodine contained in the flue gas 11A. A plurality of holes 26 (see FIG. 2) are provided on upper and lower surfaces of the filter body 25, and a rear plate 27 is provided at the other end of the filter bodies 25 opposite to the gas introduction unit 23. The flue gas 11A entering from the gas introduction hole 22 to a space between the filter bodies 25 passes through the filter body 25 and escapes to outside of the filter body 25. The iodine filter 15 is fixed by fastening the gas introduction unit 23 and the casing 21 by a bolt, for example.

Figure 2:
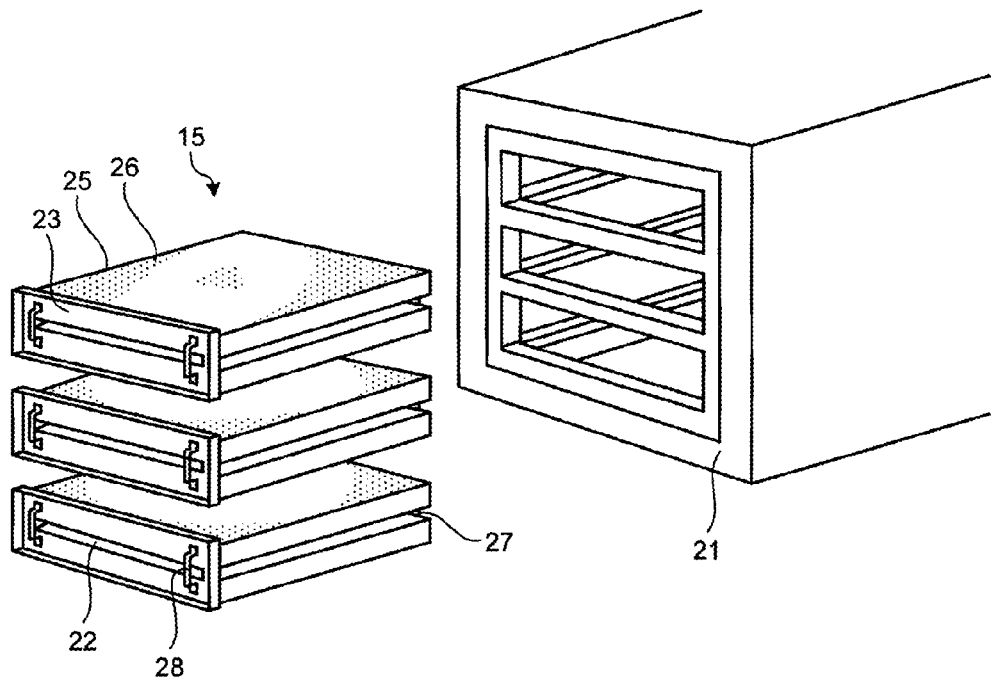
FIG. 2 is a perspective view of a case when an iodine filter is detached from a casing.

The iodine filter 15 can be detached from the casing 21 so that the radioactive iodine adsorbent 14 can be replaced by a new radioactive iodine adsorbent 14. FIG. 2 is a perspective view of a case when the iodine filter 15 is detached from the casing 21. As shown in FIG. 2, a handle 28 fitted to the iodine filter 15 is pulled to detach the iodine filter 15 from the casing 21, the gas introduction unit 23 and the filter body 25 are separated from each other, and the radioactive iodine adsorbent 14 in the filter body 25 is replaced. Accordingly, the radioactive iodine adsorbent 14 is replaced by a new radioactive iodine adsorbent 14.

The flue gas 11A is air, steam, or gas emitted from the air-conditioning and ventilating system of the nuclear power facility. A part of the flue gas 11A may be mixed with ambient air in the duct 12, and thus the flue gas 11A contains moisture in addition to the air component, and has hygroscopic moisture. The flue gas 11A is fed into the chamber 13 via the duct 12, passes through the gas introduction hole 22, and enters into the iodine filter 15. The radioactive iodine adsorbent 14 is filled in the filter body 25, and thus the flue gas 11A having entered into the iodine filter 15 from the gas introduction hole 22 passes through the hole 26 on one surface of the filter body 25 to come in contact with the radioactive iodine adsorbent 14, and radioactive iodine in the flue gas 11A is adsorbed by the radioactive iodine adsorbent 14. The flue gas 11A passes through a gap between the radioactive iodine adsorbents 14 while coming in contact with the radioactive iodine adsorbent 14, and flows to a rear side of the iodine filter 15 by passing the hole 26 on the other surface side of the filter body 25. Flue gas after radioactive iodine in the flue gas 11A has been adsorbed by the radioactive iodine adsorbent 14 is referred to as "flue gas 11B". The flue gas 11B having passed through the iodine filter 15 is emitted to outside of the system in a state where concentration of radioactive iodine in the flue gas 11B satisfies a condition of being equal to or less than activity concentration, which does not have any problem in radiation exposure evaluation.

(Radioactive Iodine Adsorbent)

The radioactive iodine adsorbent 14 includes a carrier constituting a matrix and an impregnated substance with which the carrier is impregnated. The material to be used as the carrier is not particularly limited to any type of material, and the material can be a material having a plurality of fine pores on the surface, and for example, activated carbon, alumina, zeolite, silica gel, and activated earth can be mentioned. As zeolite, either natural zeolite or synthetic zeolite can be used. As zeolite, mordenite zeolite can be mentioned. The carrier can be used singly or in combination of two or more kinds.

The radioactive iodine adsorbent 14 contains at least triethylene diamine (TEDA) expressed by an expression (1) described below as the impregnated substance.

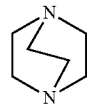

TEDA is a polyamine compound having two tertiary amino groups. The tertiary amino group is changed to quaternary ammonium and coupled with $CH_3I$, and thus $CH_3I$ is adsorbed by the tertiary amino group. That is, by using TEDA as an ion exchange material having an anion exchange group of the tertiary amino group, radioactive iodine, particularly $CH_3I$ is adsorbed by TEDA. Accordingly, the radioactive iodine adsorbent 14 can cause the tertiary amino group to react with $CH_3I$ by containing at least TEDA as the impregnated substance, and thus $CH_3I$ can be adsorbed by TEDA.

An impregnated amount of TEDA is preferably from 3.0% by mass to less than 10.0% by mass, and more preferably, from 3.0% by mass to equal to or less than 7.0% by mass. When the impregnated amount of TEDA is equal to or less than 3.0% by mass, the moisture in the flue gas 11A adheres to TEDA or the surface of the carrier and covers the surface of the carrier, and TEDA hardly adsorbs $CH_3I$. When the impregnated amount of TEDA is equal to or more than 10.0% by mass, the fine pores of the carrier are blocked by TEDA. Therefore, the radioactive iodine adsorbent 14 cannot secure an effective surface area for adsorbing the moisture and $CH_3I$ on the carrier and removing these, and the $CH_3I$ removal performance of the radioactive iodine adsorbent 14 decreases.

(Relation Between Impregnated Amount of TEDA and Adsorbed Amount of $CH_3I$)

Figure 3:
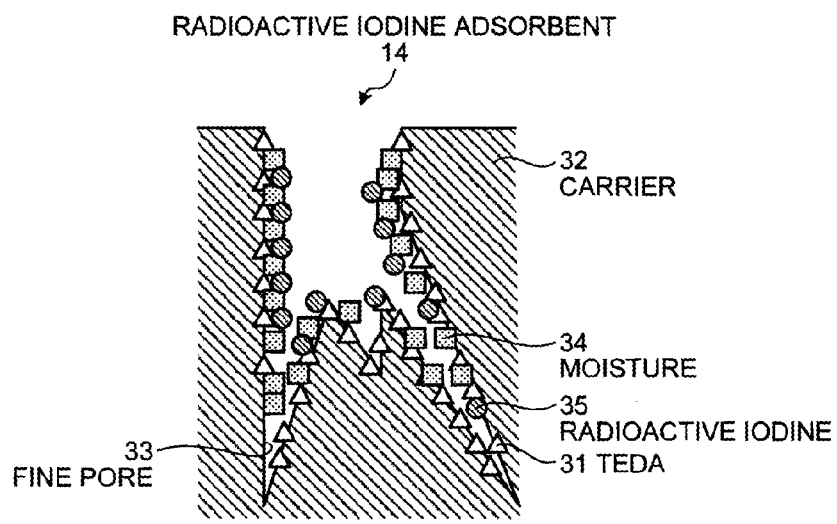
FIG. 3 schematically depicts a part of a fine pore of an iodine adsorbent when the impregnated amount of TEDA is 3.0% by mass.
Figure 4:
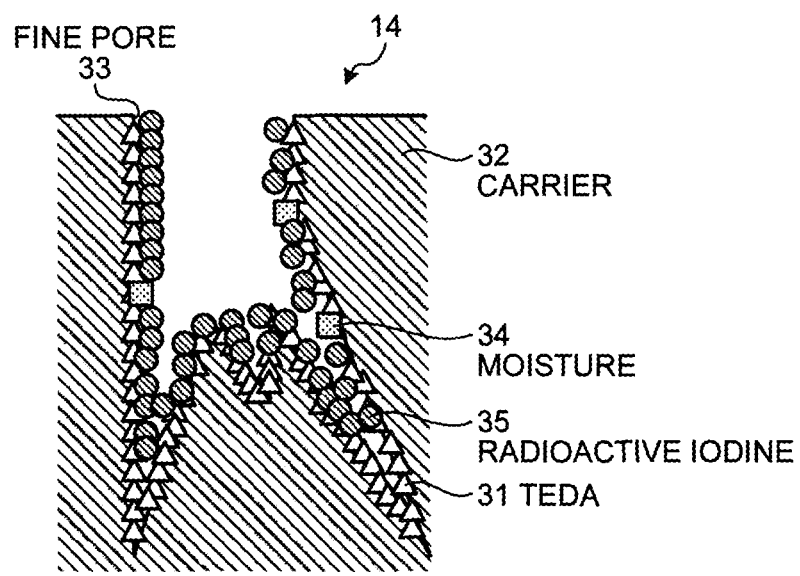
FIG. 4 schematically depicts a part of a fine pore of an iodine adsorbent when the impregnated amount of TEDA is 5.0% by mass.
Figure 5:
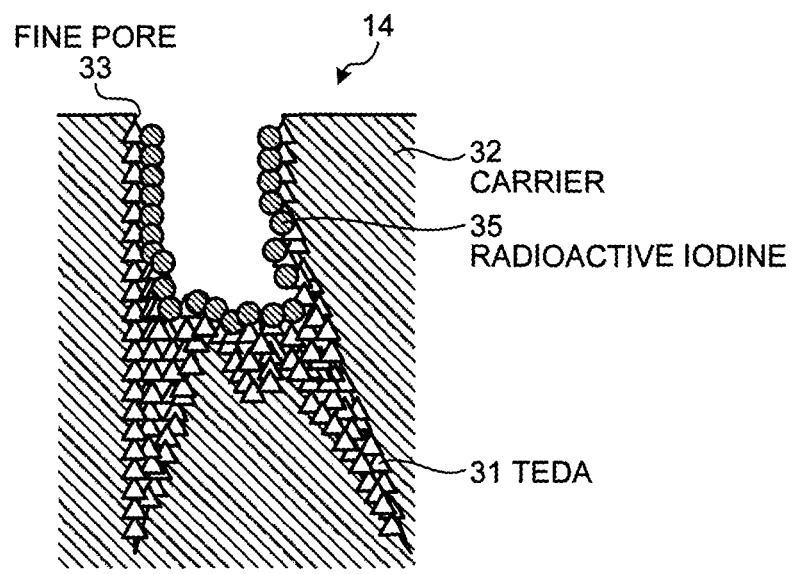
FIG. 5 schematically depicts a part of a fine pore of an iodine adsorbent when the impregnated amount of TEDA is 10.0% by mass.

States schematically indicating a fine pore of a carrier impregnated with TEDA are shown in FIGS. 3 to 5. FIG. 3 schematically depicts a part of a fine pore of an iodine adsorbent when the impregnated amount of TEDA is 3.0% by mass. FIG. 4 schematically depicts a part of a fine pore of an iodine adsorbent when the impregnated amount of TEDA is 5.0% by mass. FIG. 5 schematically depicts a part of a fine pore of an iodine adsorbent when the impregnated amount of TEDA is 10.0% by mass.

As shown in FIG. 3, when the impregnated amount of TEDA 31 is 3.0% by mass, moisture 34 in the air adheres to the TEDA 31 impregnated in a fine pore 33 of a carrier 32 or on the surface of the fine pore 33 to cover the surface of the carrier 32. Because the solubility of $CH_3I$ in water is small at a normal temperature, the moisture 34 adhering to the TEDA 31 and the surface of the carrier 32 becomes resistance, thereby considerably decreasing an adsorption rate between radioactive iodine 35 such as $I_2$ and $CH_3I$ and the TEDA 31, as compared to a case where there is no moisture 34. Consequently, the radioactive iodine 35 such as $I_2$ and $CH_3I$ cannot be adsorbed by the TEDA 31 impregnated in the fine pores 33 and the like of the carrier 32. Accordingly, it is desired that the impregnated amount of TEDA be larger than 3.0% by mass.

As shown in FIG. 4, when the impregnated amount of the TEDA 31 is 5.0% by mass, the TEDA 31 can be more densely impregnated on the surface of the carrier 32, as compared to a case where the impregnated amount of the TEDA 31 is 3.0% by mass. Because the TEDA 31 has a hydrophobic property as described later, it can be prevented that the moisture 34 adheres to the surface of the carrier 32 by impregnating the surface of the carrier 32 and the fine pores 33 with the TEDA 31 more densely. Accordingly, because the moisture 34 in the flue gas 11A does not become resistance, the radioactive iodine 35 such as $I_2$ and $CH_3I$ can be impregnated on the surface of the TEDA 31 more stably, as compared to a case where the impregnated amount of the TEDA 31 is 3.0% by mass.

As shown in FIG. 5, when the impregnated amount of the TEDA 31 is 10.0% by mass, the impregnated amount of the TEDA 31 is too large, and the TEDA 31 covers the fine pores 33 of the carrier 32. Therefore, the effective surface area on the carrier 32 for adsorbing and removing the radioactive iodine 35 such as $I_2$ and $CH_3I$ by the radioactive iodine adsorbent 14 cannot be secured. As a result, the moisture 34 is hardly adsorbed; however, the adsorption performance for the radioactive iodine 35 such as $I_2$ and $CH_3I$ decreases. Accordingly, it is preferable that the impregnated amount of the TEDA 31 is less than 10.0% by mass.

When the moisture 34 in the flue gas 11A adheres to the TEDA 31 impregnated in the fine pores 33 of the carrier 32 or on the surface of the fine pores 33, the radioactive iodine 35 such as $I_2$ and $CH_3I$ needs to dissolve in the moisture 34 so that the radioactive iodine 35 such as $I_2$ and $CH_3I$ contained in the flue gas 11A can react with the TEDA 31. However, as described above, because the solubility of the radioactive iodine 35 such as $I_2$ and $CH_3I$ in water is small at a normal temperature, when the moisture 34 adheres to the TEDA 31 or the surface of the carrier 32, the moisture 34 becomes resistance to inhibit a reaction between $I_2$ and $CH_3I$ and the TEDA 31, and the adsorption rate between the radioactive iodine 35 such as $I_2$ and $CH_3I$ and the TEDA 31 significantly decreases as compared to a case where there is no moisture 34.

Accordingly, when the radioactive iodine adsorbent 14 is used in the atmosphere in which there is moisture such as in the flue gas 11A, a large amount of the radioactive iodine adsorbent 14 is required and the iodine filter 15 becomes large. To remove the moisture 34 in the flue gas 11A reliably, a heater for evaporating moisture such as a preheater needs to be installed at a front stage of the iodine filter 15 to decrease the relative humidity. However, when a preheater is provided at the front stage of the iodine filter 15, energy for heating the flue gas 11A is required and a process required for removing radioactive iodine contained in the flue gas 11A becomes complicated.

As described above, a decrease in the $CH_3I$ removal performance of the radioactive iodine adsorbent 14 is caused by the moisture 34 formed on the surface of the radioactive iodine adsorbent 14. Accordingly, to prevent a decrease in the $CH_3I$ removal performance in the atmosphere in which the moisture 34 is present in the flue gas 11A, it is necessary that the moisture 34 is not formed on the surface of the radioactive iodine adsorbent 14.

(Relation Between Impregnated Amount of TEDA and Hydrophobization)

Figure 6:
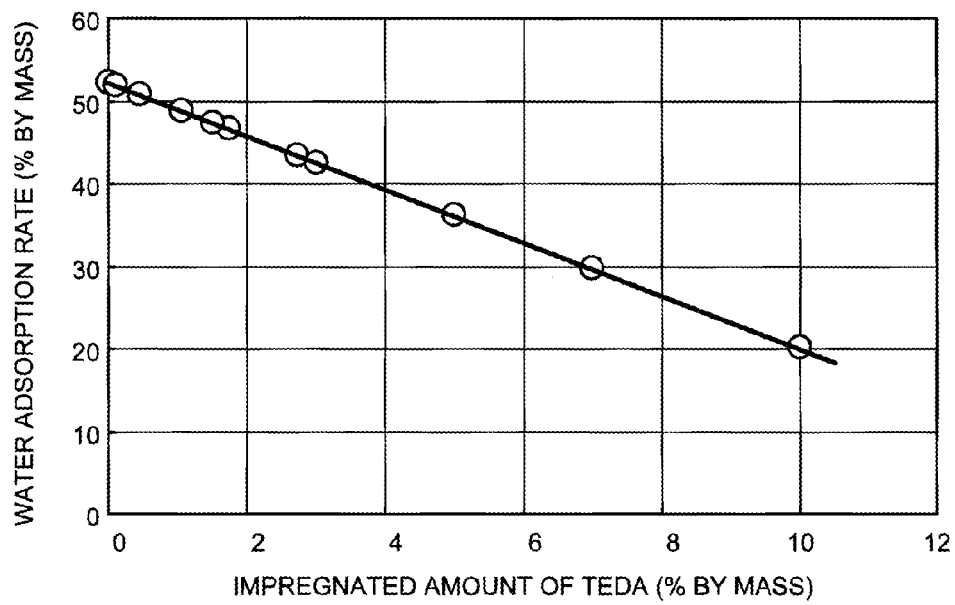
FIG. 6 depicts a relation between the impregnated amount of TEDA and a water adsorption rate.

An effect of TEDA exhibiting hydrophobization is explained below. FIG. 6 depicts a relation between the impregnated amount of TEDA and a water adsorption rate. The test was performed by impregnating the carrier with TEDA up to 10.0% by mass in the air having a temperature of 30° C. and a relative humidity of 95%. As shown in FIG. 6, the water adsorption rate decreases as the impregnated amount of TEDA increases. Accordingly, it was confirmed that the iodine adsorbent was hydrophobized as the impregnated amount of TEDA increased.

Because TEDA as the impregnated substance has the hydrophobic property, a decrease in the removal performance for radioactive iodine such as $I_2$ and $CH_3I$ can be prevented by increasing the impregnated amount of TEDA. At this time, when the impregnated amount of TEDA on the surface of the carrier is equal to or less than 3.0% by mass, as described above, moisture in the flue gas 11A adheres to TEDA and the carrier, thereby suppressing impregnation of radioactive iodine such as $I_2$ and $CH_3I$ on the surface of TEDA. When the impregnated amount of TEDA on the surface of the carrier is equal to or more than 10.0% by mass, as described above, the impregnated amount of TEDA in the fine pores of the carrier becomes too large, and TEDA covers the fine pores of the carrier, and thus the radioactive iodine adsorbent 14 cannot secure the effective surface area for adsorbing and removing radioactive iodine such as $I_2$ and $CH_3I$ by the carrier, thereby decreasing the removal performance for radioactive iodine such as $I_2$ and $CH_3I$.

In the radioactive iodine adsorbent 14 according to the present embodiment, the carrier is impregnated with TEDA in a range from 3.0% by mass to less than 10.0% by mass. By setting the impregnated amount of TEDA in the carrier to the above range, the surfaces of the carrier and the fine pores are covered with TEDA. Accordingly, it is possible to suppress adherence of moisture to TEDA having the hydrophobic property, and the adsorption amount of moisture to the carrier can be decreased. As a result, radioactive iodine such as $I_2$ and $CH_3I$ can be adsorbed by the radioactive iodine adsorbent 14 and removed from the flue gas 11A, without the absorption being hindered by moisture in the flue gas 11A.

(Relation Between Impregnated Amount of TEDA and Transmittance of Organic Iodine Compound)

Figure 7:
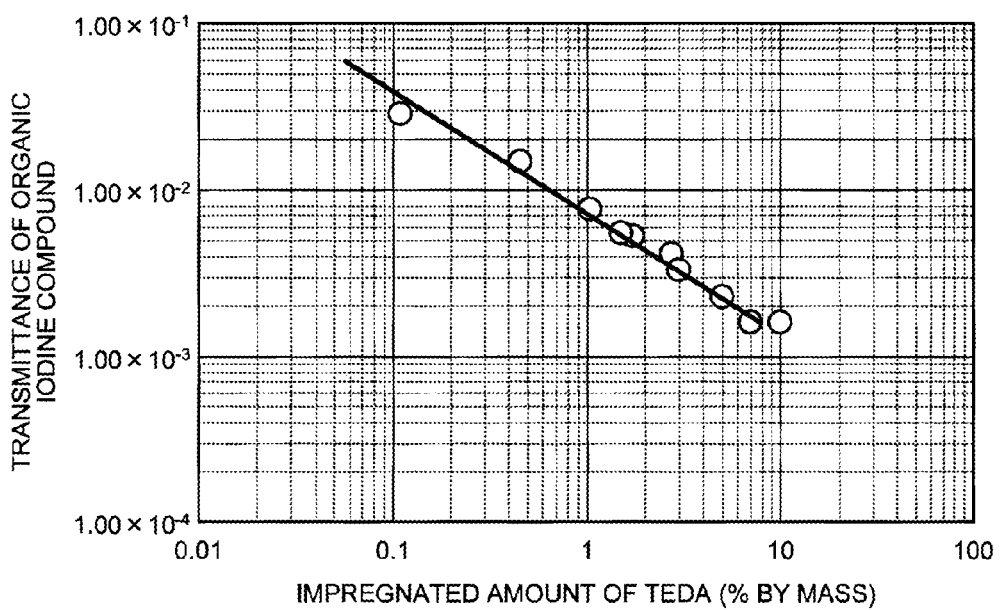
FIG. 7 depicts a relation between the impregnated amount of TEDA and a transmittance of an organic iodine compound.

An effect of the impregnated amount of TEDA on the transmittance of the organic iodine compound is explained below. FIG. 7 depicts a relation between the impregnated amount of TEDA and a transmittance of an organic iodine compound. This test was performed by impregnating the carrier with TEDA up to 10.0% by mass. The transmittance of the organic iodine compound indicates a transmittance of the organic iodine compound when a content of the organic iodine compound in flue gas is 1.0. The organic iodine compound is mainly $CH_3I$. As shown in FIG. 7, the transmittance of the organic iodine compound when the impregnated amount of TEDA is about 0.1% by mass is about $3.0 \times 10^{-2}$. A removal rate of the organic iodine compound at this time is about 97%. The transmittance of the organic iodine compound when the impregnated amount of TEDA is about 3.0% by mass is about $3.0 \times 10^{-3}$. The removal rate of the organic iodine compound at this time is about 99.7%. The transmittance of the organic iodine compound when the impregnated amount of TEDA is about 7.0% by mass is about $1.5 \times 10^{-3}$. The removal rate of the organic iodine compound at this time is about 99.9%.

Accordingly, the transmittance of the organic iodine compound can be decreased as the impregnated amount of TEDA increases. Meanwhile, even if the impregnated amount of TEDA was increased to 10.0% by mass, the transmittance of the organic iodine compound hardly changed as compared to a case where the impregnated amount of TEDA was 7.0% by mass, and a decrease in the transmittance of the organic iodine compound was not observed. Therefore, even if the impregnated amount of TEDA is equal to or more than 10.0% by mass, a further decrease in the transmittance of the organic iodine compound cannot be expected.

Accordingly, the transmittance of the organic iodine compound can be decreased to about $1.5 \times 10^{-3}$ by setting the impregnated amount of TEDA in the carrier to the above range. That is, when the impregnated amount of TEDA is within the above range, because the transmitted amount of the organic iodine compound decreases as the impregnated amount of TEDA increases, the removal efficiency for the organic iodine compound increases, and the removal performance for the organic iodine compound can be improved.

The standard value for replacement with respect to the radioactive iodine removal rate is about 97% at present. However, when the impregnated amount of TEDA is within the above range, the radioactive iodine removal rate of the radioactive iodine adsorbent 14 is equal to or higher than 99.8%, and thus the standard for the radioactive iodine removal rate is sufficiently satisfied. When the impregnated amount of TEDA is within the above range, the radioactive iodine removal rate is high from an initial stage, and thus the time required for the radioactive iodine removal rate to decrease to the standard value for replacement (97%) with respect to the radioactive iodine removal rate can be increased.

Therefore, according to the radioactive iodine adsorbent 14 of the present embodiment, TEDA is used as the impregnated substance with which the carrier of the iodine adsorbent is impregnated and the impregnated amount of TEDA is set within the above range. Accordingly, the flue gas 11A is hardly affected by the humidity even in an atmosphere in which there is a rapid humidity change such as a high-humidity atmosphere, and a decrease in the radioactive iodine removal performance is suppressed, thereby enabling to maintain the radioactive iodine removal rate stably higher than a predetermined standard value for replacement. Furthermore, the radioactive iodine removal rate at an early stage of use is improved, thereby enabling to use the radioactive iodine adsorbent 14 for a long time.

By improving the radioactive iodine removal rate at the early stage of use of the radioactive iodine adsorbent 14 according to the present embodiment, the radioactive iodine adsorbent 14 can be used for a longer time than a conventional adsorbent, and a replacement frequency of the radioactive iodine adsorbent 14 with a new one can be decreased. As a result, a period during which a nuclear power facility can be continuously operated can be increased. Because the replacement frequency of the radioactive iodine adsorbent 14 is decreased, discharge of low-level waste can be suppressed.

The impregnated substance can contain at least one of potassium iodide (KI), iodine ($I_2$), and silver (Ag) in addition to TEDA. TEDA has two tertiary amino groups. The tertiary amino group is a weakly basic anion-exchange group, and has adsorption capacity for an ionic substance such as $I_2$, hydroiodic acid (HI), and $CH_3I$. However, adsorption power thereof is weak, and although the adsorption capacity of $CH_3I$ can be maintained, the removal rate of $I_2$ and HI is slow only by the tertiary amino group of TEDA.

Therefore, it is desired that the radioactive iodine adsorbent 14 according to the present embodiment contain at least one of KI, $I_2$, and Ag as the impregnated substance in addition to TEDA. By containing one or both of KI and $I_2$, radioactive iodine performs isotope exchange with non-radioactive iodine such as KI and $I_2$, and can adsorb radioactive iodine. By containing Ag as the impregnated substance, radioactive iodine reacts with Ag to become AgI, and radioactive iodine can be adsorbed.

Accordingly, by adding at least one component of Ki, $I_2$, and Ag in addition to TEDA, the impregnated substance can adsorb radioactive iodine such as $I_2$ other than $CH_3I$ contained in the flue gas 11A, while mainly adsorbing $CH_3I$ contained in the flue gas 11A by TEDA. Therefore, the adsorption capacity for radioactive iodine of the radioactive iodine adsorbent 14 can be increased further.

The shape of the radioactive iodine adsorbent 14 can be powder pulverized to a predetermined grain diameter or a compact obtained by pressure forming the powder. As the shape of the compact, pellet, briquette, granular such as a granular spherical body, cylindrical, almond-like, fibrous, matchstick-like, blanket-like, or honeycomb can be mentioned. Because the radioactive iodine adsorbent 14 can be formed in an arbitrary shape, the radioactive iodine adsorbent 14 can be arranged and used in an arbitrary shape according to the size or the like in the filter body 25, and the adsorption capacity for radioactive iodine of the radioactive iodine adsorbent 14 can be further increased by increasing the surface area of the radioactive iodine adsorbent 14.

In the present embodiment, the three iodine filters 15 are provided in the chamber 13. However, the present embodiment is not limited thereto, and one, two, or four or more iodine filters 15 can be provided in the chamber 13, and the number of the iodine filters 15 can be appropriately changed according to the inner diameter of the chamber 13, an installation area of the iodine filter 15, the size of the external diameter of the gas introduction unit 23, and the like.

As described above, according to the radioactive iodine removal apparatus 10 applying the radioactive iodine adsorbent of the present embodiment, TEDA is used as the impregnated substance with which the carrier of the radioactive iodine adsorbent 14 is impregnated, and the impregnated amount of TEDA is set within the predetermined range. Accordingly, the adsorption capacity for radioactive iodine can be stably maintained higher than a predetermined standard value for replacement, even when flue gas is in the high-humidity atmosphere or in an atmosphere having a rapid humidity change, and release of radioactive iodine into the air can be suppressed. Furthermore, the radioactive iodine removal rate at an early stage of use of the radioactive iodine adsorbent 14 is improved to improve the durability of the radioactive iodine adsorbent 14, and the radioactive iodine adsorbent 14 can be used for a long time, thereby enabling to decrease the replacement frequency of the radioactive iodine adsorbent 14, and to contribute to extension of the period during which a nuclear power facility can be continuously operated. Discharge of low-level waste can be decreased by decreasing the replacement frequency of the radioactive iodine adsorbent 14.

In the present embodiment, one radioactive iodine removal apparatus 10 is provided in the chamber 13. However, the present embodiment is not limited thereto. For example, a plurality of radioactive iodine removal apparatuses 10 can be provided depending on a distance from an inlet port to an outlet port of the chamber 13, an installation area of the radioactive iodine removal apparatus 10, and the like.

Figure 8:
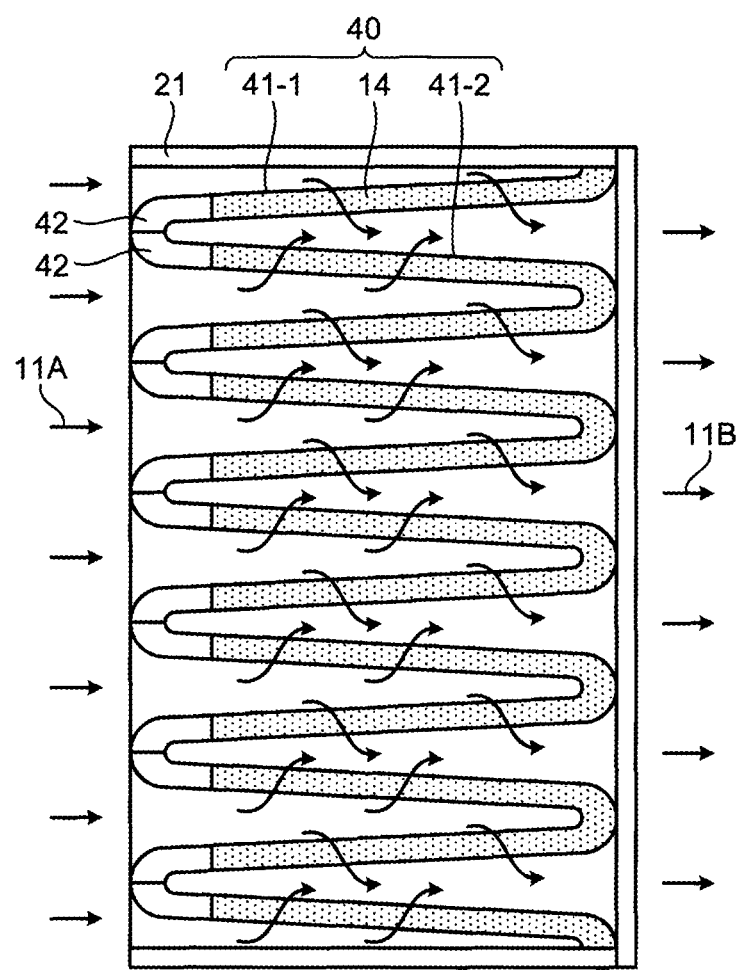
FIG. 8 depicts an example of another configuration of the iodine filter in a simplified manner.

In the radioactive iodine removal apparatus 10 according to the present embodiment, a tray-type filter body 25 is used for the casing 21 as the iodine filter 15, and the radioactive iodine adsorbent 14 is filled in the filter body 25. However, the present embodiment is not limited thereto. FIG. 8 depicts an example of another configuration of the iodine filter 15 in a simplified manner. As shown in FIG. 8, an iodine filter 40 includes wave-formed porous plates 41-1 and 41-2, and the radioactive iodine adsorbent 14 filled in the porous plates 41-1 and 41-2. The porous plates 41-1 and 41-2 include a plurality of pores, through which the flue gas 11A can pass, on the opposite surfaces. The porous plates 41-1 and 41-2 or the adjacent porous plates 41-2 are coupled by a coupling member 42. The wave-formed porous plates 41-1 and 41-2 are provided in the casing 21, and the radioactive iodine adsorbent 14 is filled in the porous plates 41-1 and 41-2.

The flue gas 11A passes through the pores on one surface of the porous plates 41-1 and 41-2 to come in contact with the radioactive iodine adsorbent 14, and radioactive iodine in the flue gas 11A is adsorbed by the radioactive iodine adsorbent 14. The flue gas 11A passes through a gap between the radioactive iodine adsorbents 14 while coming in contact with the radioactive iodine adsorbent 14, and passes through the pores on the other surface of the porous plates 41-1 and 41-2. The flue gas 11B in which radioactive iodine has been removed flows to a downstream side of the iodine filter 40. The flue gas 11B is emitted to outside of the system in a state where concentration of radioactive iodine in the flue gas 11B satisfies a condition of being equal to or less than the activity concentration, which does not have any problem in radiation exposure evaluation.

In the radioactive iodine removal apparatus 10 according to the present embodiment, a case of including only one duct 12 is explained. However, the present invention is not limited thereto. When a plurality of ducts 12 including the chamber 13 are provided, the flue gas 11A is fed to the ducts 12 alternately, and the radioactive iodine removal apparatus 10 in each chamber 13 can be used, while the nuclear power facility is in operation.

FIG. 9 depicts treatment of the flue gas 11A in a case where the plurality of ducts 12 are provided. As shown in FIG. 9, when two ducts 12-1 and 12-2 are provided in parallel, a chamber 13-1 or 13-2 respectively including a radioactive iodine removal apparatus 10-1 or 10-2 is provided for each of the ducts 12-1 and 12-2. Adjustment valves V11 and V12 for adjusting a flow rate of the flue gas 11A are provided in the duct 12-1 on upstream and downstream sides of the chamber 13-1, and adjustment valves V13 and V14 for adjusting a flow rate of the flue gas 11A are provided in the duct 12-2 on upstream and downstream sides of the chamber 13-2.

The adjustment valves V11 and V12 are closed to suspend feed of the flue gas 11A to the one duct 12-1, and replacement of a radioactive iodine adsorbent 14-1 of an iodine filter 15-1 in the chamber 13-1 is performed. During this time, the adjustment valves V13 and V14 are opened to feed the flue gas 11A to the other duct 12-2, and radioactive iodine in the flue gas 11A is removed by using another iodine filter 15-2, while replacing the radioactive iodine adsorbent 14-1 in the chamber 13-1 by a new radioactive iodine adsorbent. When replacement of the radioactive iodine adsorbent 14-1 is finished and a radioactive iodine adsorbent 14-2 of the iodine filter 15-2 is in a replacement period, the adjustment valves V13 and V14 are closed and the adjustment valves V11 and V12 are opened, to remove radioactive iodine in the flue gas 11A by using the iodine filter 15-1, while replacing the radioactive iodine adsorbent 14-2 in the chamber 13-2 by a new radioactive iodine adsorbent.

Accordingly, radioactive iodine in the emitted flue gas 11A can be removed continuously and stably by the iodine filter 15-1 or 15-2, and thus the radioactive iodine adsorbent 14-1 or 14-2 can be replaced by a new radioactive iodine adsorbent, while continuously operating the nuclear power facility and without shutting down the nuclear power facility.

The adjustment valves V11 to V14 are provided on the inlet port sides and the outlet port sides of the respective ducts 12-1 and 12-2 to control flow of the flue gas 11A. However, a switching valve can be provided at a branching point of the duct 12. Furthermore, a case of providing the two ducts 12 is explained above; however, a plurality of ducts 12 more than two can be provided.

In the radioactive iodine removal apparatus 10 according to the present embodiment, the iodine filter 15 is provided in the chamber 13. However, the present invention is not limited thereto, and the iodine filter 15 can be provided in the duct 12, other than in the chamber 13.

In the radioactive iodine removal apparatus 10 according to the present embodiment, there has been explained flue gas containing radioactive iodine in a high-humidity atmosphere in an air-conditioning and ventilating system of a nuclear power facility such as a nuclear generation facility. However, the present embodiment is not limited thereto, and the present embodiment can be applied to flue gas containing radioactive iodine not in a high-humidity atmosphere emitted from a nuclear power facility. Furthermore, the present embodiment is also applicable to flue gas containing radioactive iodine, which is emitted from factories, research laboratories, and the like other than nuclear power facilities, such as a reprocessing plant and a radioisotope handling facility due to the usage of nuclear fuel, and gas to be treated containing radioactive iodine emitted from hospitals and the like due to the usage of nuclear fuel.

REFERENCE SIGNS LIST

10 radioactive iodine removal apparatus
11A, 11B flue gas (gas to be treated)
12 duct
13 chamber (container)
14 radioactive iodine adsorbent
15, 40 iodine filter
21 casing
22 gas introduction hole
23 gas introduction unit
25 filter body
26 hole
27 rear plate
28 handle
31 TEDA
32 carrier
33 fine pore
34 moisture
35 radioactive iodine
41-1, 41-2 porous plate
42 coupling member

The invention claimed is:

1. A radioactive iodine adsorbent for adsorbing radioactive iodine contained in gas to be treated, consisting essentially of:
   a carrier constituted by at least one of alumina, zeolite, silica gel, and activated earth; and
   an impregnated substance impregnated on the carrier, the impregnated substance containing triethylene diamine and at least one of potassium iodide, iodine, and silver,
   wherein an impregnated amount of the triethylene diamine is from 3.0% by mass to less than 10.0% by mass, and
   wherein a transmittance of an organic iodine compound is between $3.0 \times 10^{-3}$ to $1.5 \times 10^{-3}$ where the transmittance of the organic iodine compound is a transmittance of the organic iodine compound when a content of the organic iodine compound in flue gas is 1.0.

2. The radioactive iodine adsorbent according to claim 1, wherein
   the radioactive iodine adsorbent is granular or fibrous or has a spherical shape, a cylindrical shape, an almond-like shape, a matchstick-like shape, a blanket-like shape, or a honeycomb shape.

3. The radioactive iodine adsorbent according to claim 1, wherein the gas to be treated is flue gas emitted from an air-conditioning and ventilating system of a nuclear power facility.

4. A radioactive iodine removal apparatus that is provided in a duct or a chamber to which gas to be treated containing radioactive iodine is fed, the radioactive iodine removal apparatus comprising:
   the radioactive iodine adsorbent according to claim 1.

5. The radioactive iodine removal apparatus according to claim 4, further comprising:

a pair of filter bodies, each including a plurality of holes through which the gas to be treated passes with the radioactive iodine, the radioactive iodine adsorbent being housed in the filter bodies;

a gas introduction unit provided at one end of the filter bodies, the gas introduction unit being provided with a gas introduction hole between the pair of filter bodies; and a rear plate provided at other end of the filter bodies, the rear plate being provided between the pair of filter bodies, wherein the flue gas enters from the plurality of holes through the filter body and escapes to outside of the filter body and the radioactive iodine is adsorbed onto radioactive iodine absorbent.

6. The radioactive iodine removal apparatus according to claim 4, further comprising:

a plurality wave-formed porous plates for filling the radioactive iodine adsorbent, each of the wave-formed porous plates being provided with a plurality of pores through which the flue gas passes, wherein the wave-formed porous plates are arranged so that a gap between two of the wave-formed porous plates narrows toward downstream of the flue gas.

* * * * *